(12) United States Patent
Kizhakhemadtil et al.

(10) Patent No.: US 11,315,186 B1
(45) Date of Patent: Apr. 26, 2022

(54) AUTOMATIC EXECUTION OF SUBSCRIPTION-BASED FINANCIAL INSTRUMENT TRADING STRATEGIES IN REAL-TIME

(71) Applicant: FMR LLC, Boston, MA (US)

(72) Inventors: Biju Kozhikode Kizhakhemadtil, Hingham, MA (US); Douglas Alves, Salt Lake City, UT (US); Pankti Kanubhai Patel, South Jordan, UT (US); Kseniya Galper, Boston, MA (US); Scott Huffman, Salt Lake City, UT (US); Peyton Luxford, Somerville, MA (US); Pedro Armelin, Old Greenwich, CT (US); Susan Fabry, Newton, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/531,324

(22) Filed: Nov. 19, 2021

(51) Int. Cl.
   *G06Q 40/04* (2012.01)
   *G06Q 40/06* (2012.01)

(52) U.S. Cl.
   CPC .......... *G06Q 40/04* (2013.01); *G06Q 40/06* (2013.01)

(58) Field of Classification Search
   CPC .................. G06Q 40/04; G06Q 40/06
   See application file for complete search history.

(56) References Cited

U.S. PATENT DOCUMENTS

| | | | |
|---|---|---|---|
| 7,739,182 B2 * | 6/2010 | Myr ..................... | G06Q 40/06 705/37 |
| 7,908,203 B2 | 3/2011 | Shapiro et al. | |
| 8,504,458 B1 | 8/2013 | Lai et al. | |
| 9,152,996 B2 | 10/2015 | Murphy et al. | |
| 10,592,987 B2 | 3/2020 | Dennelly et al. | |
| 10,838,921 B2 | 11/2020 | Haddad | |
| 2008/0270289 A1 | 10/2008 | Petrino | |
| 2013/0159832 A1 | 6/2013 | Ingargiola et al. | |
| 2014/0297503 A1 * | 10/2014 | Murphy ................ | G06Q 40/00 705/37 |

(Continued)

FOREIGN PATENT DOCUMENTS

| | | | | |
|---|---|---|---|---|
| WO | WO-2004095181 A2 * | 11/2004 | ............. | G06Q 40/04 |
| WO | WO-2013071330 A1 * | 5/2013 | ............. | G06Q 40/04 |

OTHER PUBLICATIONS

Murphy et al.: Learning dynamics of technical trading strategies, Dec. 24, 2019, pp. 1-35 (Year: 2019).*

(Continued)

*Primary Examiner* — Bijendra K Shrestha
(74) *Attorney, Agent, or Firm* — Proskauer Rose LLP

(57) ABSTRACT

Methods and apparatuses are described for automatic execution of subscription-based financial instrument trading strategies in real-time. A server receives a request to deploy a trading strategy with trading strategy parameters. The server determines that a trading strategy has already been created for other users based upon the parameters. The server generates a subscription to the trading strategy, which comprises indicators needed to deploy the trading strategy. The server identifies at least one indicator that has already been calculated and calculates any of the indicators that have not already been calculated. The server deploys the trading strategy using the identified and calculated indicators.

26 Claims, 19 Drawing Sheets

(56) References Cited

U.S. PATENT DOCUMENTS

2015/0235318 A1 8/2015 Huan

OTHER PUBLICATIONS

Mitchel, K.: The Best Technical Indicators for Day Tradung, Oct. 9, 2021, The Balance, pp. 1-15. (Year: 2021).*
CurrenSea, E.: MomentumTrading—What is it and which are the best system for it? Sep. 6, 2021, pp. 1-19 (Year: 2021).*

* cited by examiner

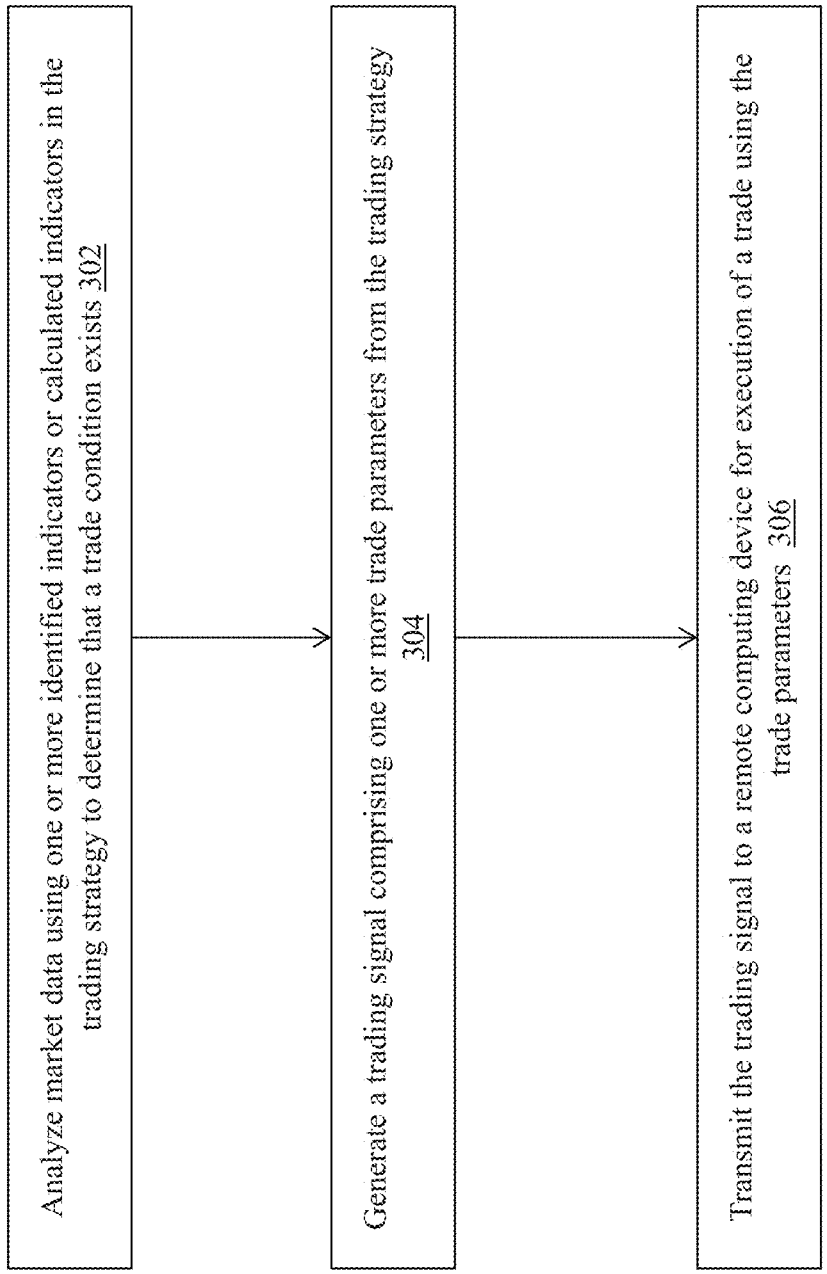

Simple Moving Average Crossover

How It Works?

Summary/Definition: Moving averages are a proven method for identifying trends. The SMA is simply the average price over a specified period. At the end of each trading day, the oldest closing price is deleted, and the newest added, creating a line made up of data points that moves across the chart as the average value changes. Indicators SMAs are often used to determine trend direction. Typically, two moving averages with different period intervals are plotted, let's say 50 and 200. The convergence or divergence of these two lines can signal an impending price change. For example, it's considered a bullish signal – sometimes called a Golden Cross – when a 50-interval moving average crosses above a 200-interval moving average. Conversely, when that same 50-interval crosses below the 200-interval line, a downward price trend is indicated. Calculations SMA is the average of the closing price of the stock over a specified period of time. Various periods are used – 10, 20, 50, 100 or 200, commonly. What to look for The SMA and other moving averages are trend identifiers, but lagging indicators, meaning they reflect what has already happened. The SMA is not designed, by itself, to make predictions. However, experienced technical analysts will frequently use the SMA in conjunction with other methods. As an indicator of price trends, the SMA is a valuable tool for confirming a price trend direction over short- and long-term periods.

Indicators
SMA

Commonly used for:
Bullish market conditions, swing trading

FIG. 4D

| PARAMETERS | SIGNALS | | | |
|---|---|---|---|---|
| | | PRICE | SHARES | TOTAL COST |
| ▲ | Buy ETSY<br>10/6/2021, 10:57 AM | $206.88 | 53.105 | $10,986.29 ← 618 |
| ▼ | Sell ETSY<br>10/6/2021, 10:53 AM | $206.61 | 53.174 | $10,986.29 |
| ▲ | Buy ETSY<br>10/6/2021, 10:17 AM | $204.60 | 53.174 | $10,879.45 |
| ▼ | Sell ETSY<br>10/6/2021, 9:57 AM | $203.83 | 53.376 | $10,879.45 |
| ▲ | Buy ETSY<br>10/6/2021, 9:39 AM | $204.96 | 53.376 | $10,939.76 |
| ▼ | Sell ETSY<br>10/5/2021, 3:55 PM | $203.70 | 53.705 | $10,939.76 |
| ▲ | Buy ETSY<br>10/5/2021, 3:44 PM | $204.44 | 53.705 | $10,979.51 |

AUTOMATIC EXECUTION OF SUBSCRIPTION-BASED FINANCIAL INSTRUMENT TRADING STRATEGIES IN REAL-TIME

TECHNICAL FIELD

This application relates generally to methods and apparatuses, including computer program products, for automatic execution of subscription-based financial instrument trading strategies in real-time.

BACKGROUND

Many financial trading software applications, tools, and platforms have appeared in recent years, each promising to deliver a streamlined and simplified investment research and trading experience. However, many of these offerings rely on a convoluted processing workflow and user interface (more suited to institutional investors than retail investors) which makes tasks such as developing, testing, and deploying trading strategies cumbersome and inefficient. In addition, backend computing systems that monitor market data and execute transactions according to specifically-defined trading strategies and algorithms are not able to efficiently leverage data and metadata associated with previously-executed trading strategies in order to improve transaction times and reduce latency in the overall transaction process. For example, trading strategies (e.g., a combination of stock symbol(s) and market condition(s) as defined in one or more technical indicators) that are requested or employed by a plurality of different users may share common data points or features. However, in typical financial trading platforms, these trading strategies are deployed and implemented on an individual user level, which causes the underlying algorithm(s) to be independently analyzed and re-calculated for each user. This approach leads to duplicative processing, increased bandwidth and computing requirements for the backend systems, and introduces significant latency and delays in the trade execution process.

SUMMARY

Therefore, what is needed are computerized methods and systems that provide for a subscription-based trading strategy model, where pre-built and/or user-customized trading strategies can be deployed for multiple users without requiring individualized recalculation of underlying metrics. The techniques described herein advantageously leverage a low-latency data cache that stores subscribed trading strategies and related data elements to enable reuse of trading algorithms across many users and avoid the processing bottleneck that would result in deploying, evaluating, and generating trade signals for the same trading algorithm for each user. As a result, the techniques described herein enable faster, more efficient execution of transactions and provide for real-time trade analysis, backtesting, and configuration.

The invention, in one aspect, features a system for automatic execution of subscription-based financial instrument trading strategies in real-time. The system includes a server computing device with a memory for storing computer-executable instructions and a processor that executes the computer-executable instructions. The server computing device receives, from a client computing device, a request to deploy a trading strategy, the request comprising one or more trading strategy parameters and a user identifier for a first user. The server computing device determines that one or more trading strategies have already been created for one or more other users based upon the trading strategy parameters. The server computing device generates a subscription to one of the trading strategies for the first user, the trading strategy comprising one or more indicators needed to deploy the trading strategy. The server computing device identifies at least one of the indicators needed to deploy the trading strategy that has already been calculated for one or more other users and retrieves the identified indicators from a cache. The server computing device calculates any of the indicators needed to deploy the trading strategy that have not already been calculated for one or more other users and stores the calculated indicators in the cache. The server computing device deploys the trading strategy for the first user using the identified indicators and the calculated indicators, including: analyzing market data using one or more identified indicators or calculated indicators in the trading strategy to determine that a trade condition exists, generating a trading signal comprising one or more trade parameters from the trading strategy, and transmitting the trading signal to a remote computing device for execution of a trade using the trade parameters.

The invention, in another aspect, features a computerized method of automatic execution of subscription-based financial instrument trading strategies in real-time. A server computing device receives, from a client computing device, a request to deploy a trading strategy, the request comprising one or more trading strategy parameters and a user identifier for a first user. The server computing device determines that one or more trading strategies have already been created for one or more other users based upon the trading strategy parameters. The server computing device generates a subscription to one of the trading strategies for the first user, the trading strategy comprising one or more indicators needed to deploy the trading strategy. The server computing device identifies at least one of the indicators needed to deploy the trading strategy that has already been calculated for one or more other users and retrieves the identified indicators from a cache. The server computing device calculates any of the indicators needed to deploy the trading strategy that have not already been calculated for one or more other users and stores the calculated indicators in the cache. The server computing device deploys the trading strategy for the first user using the identified indicators and the calculated indicators, including: analyzing market data using one or more identified indicators or calculated indicators in the trading strategy to determine that a trade condition exists, generating a trading signal comprising one or more trade parameters from the trading strategy, and transmitting the trading signal to a remote computing device for execution of a trade using the trade parameters.

Any of the above aspects can include one or more of the following features. In some embodiments, determining that one or more trading strategies have already been created for one or more other users based upon the trading strategy parameters comprises: identifying a plurality of trading strategies that have already been created for one or more other users based upon the trading strategy parameters; displaying the identified plurality of trading strategies on the client computing device; and receiving a selection of one of the identified plurality of trading strategies from the client computing device. In some embodiments, displaying the identified plurality of trading strategies on the client computing device comprises: executing a backtest on each identified trading strategy using a set of backtest parameters to generating backtest results for each identified trading strategy; and displaying the backtest results for each identified trading strategy on the client computing device. In some embodiments, executing a backtest on each identified trading strategy comprises: determining that one or more calculations in the backtest for an identified trading strategy have already been generated for one or more other users; retrieving the calculations in the backtest that have already been generated from the cache; and executing the backtest on the identified trading strategy using the retrieved calculations.

In some embodiments, the identified plurality of trading strategies are displayed on the client computing device as tiles in a grid layout. In some embodiments, transmitting the trading signal to a remote computing device for execution of a trade using the trade parameters comprises: retrieving a trade price for at least one financial instrument identified in the trade parameters; determining a trade quantity of the at least one financial instrument using the trade price; and transmitting the trading signal, the trade price and the trade quantity to the remote computing device. In some embodiments, the remote computing device simulates execution of the trade based upon the trading signal, the trade price and the trade quantity and displays a result of the simulated execution on the client computing device. In some embodiments, the remote computing device generates a trade alert upon receiving the trading signal from the server computing device and transmits the trade alert to the client computing device. In some embodiments, the remote computing device executes the trade upon receiving a message from the client computing device in response to the trade alert. In some embodiments, the remote computing device executes the trade based upon the trade price and the trade quantity upon receiving the trading signal from the server computing device.

In some embodiments, the identified indicators are retrieved from the cache without re-calculating the identified indicators. In some embodiments, the one or more trading strategy parameters comprise a stock symbol. In some embodiments, the user identifier comprises an account number.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a flow diagram of a computerized method of execution of the automatically-deployed subscription-based financial instrument trading strategies in real-time.

FIG. 4D is a diagram of an exemplary trading strategy detail window generated by the user interface module.

FIG. 6C is a diagram of an exemplary signal user interface generated by the user interface to view signals generated as part of a backtest.

DETAILED DESCRIPTION

Figure 1:
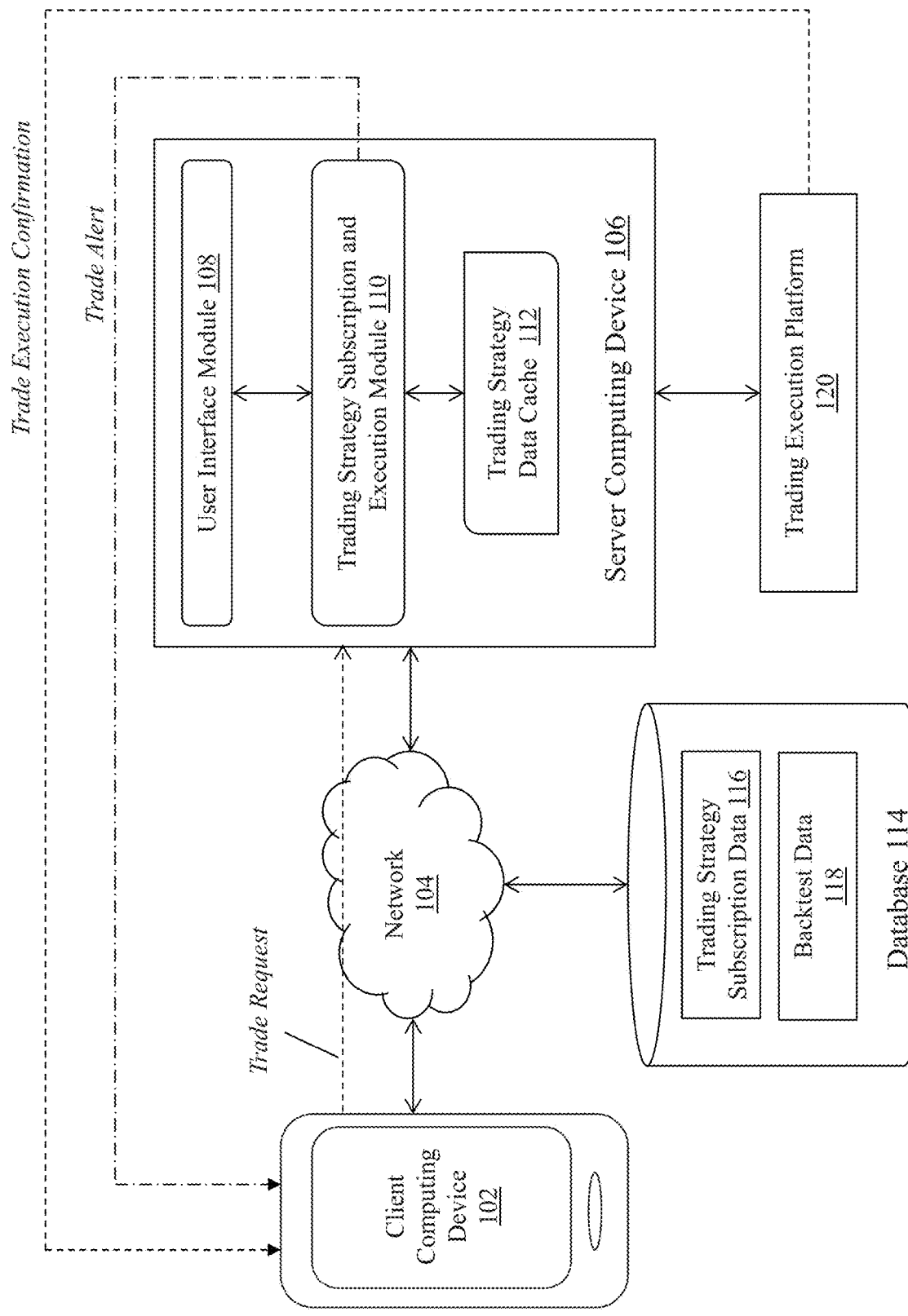
FIG. 1 is a block diagram of a system for automatic execution of subscription-based financial instrument trading strategies in real-time.

FIG. 1 is a block diagram of a system 100 for automatic execution of subscription-based financial instrument trading strategies in real-time. The system 100 includes a client computing device 102, a communications network 104, a server computing device 106 that includes a user interface module 108, a trading strategy subscription and execution module 110 and a trading strategy data cache 112, a database 114 that includes trade strategy data 116 and backtest data 118, and a trading execution platform 120.

The client computing device 102 connects to one or more communications networks (e.g., network 104) in order to communicate with the server computing device 106 to provide input and receive output relating to automatic execution of subscription-based financial instrument trading strategies in real-time as described herein. Exemplary client computing devices 102 include but are not limited to server computing devices, desktop computers, laptop computers, tablets, mobile devices, smartphones, and the like. Typically, the client computing device 102 includes a display device (not shown) that is embedded in and/or coupled to the client computing device for the purpose of displaying information to a user of the device. It should be appreciated that other types of computing devices that are capable of connecting to the components of the system 100 can be used without departing from the scope of invention. Although FIG. 1 depicts one client computing device 102, it should be appreciated that the system 100 can include any number of client computing devices.

In some embodiments, the client computing device 102 can execute one or more software applications that are used to provide input to and receive output from the server computing device 106. For example, the client computing device 102 can be configured to execute one or more native applications and/or one or more browser applications. Generally, a native application is a software application (in some cases, called an 'app') that is installed locally on the client computing device 102 and written with programmatic code designed to interact with an operating system that is native to the client computing device 102. Such software may be available from, e.g., the Apple® App Store, the Google® Play Store, the Microsoft® Store, or other software download platforms depending upon, e.g., the type of device used. In some embodiments, the native application includes a software development kit (SDK) module that is executed by a processor of the client computing device 102 to perform functions associated with automatic execution of subscription-based financial instrument trading strategies in real-time as described herein. Generally, a browser application comprises software executing on a processor of the client computing device 102 that enables the client computing device to communicate via HTTP or HTTPS with remote servers addressable with URLs (e.g., server computing device 106) to receive website-related content, including one or more webpages, for rendering in the browser application and presentation on the display device coupled to the client computing device 102. Exemplary mobile browser application software includes, but is not limited to, Firefox™, Chrome™, Safari™, and other similar software. The one or more webpages can comprise visual and audio content for display to and interaction with a user.

The communications network 104 enables the client computing device 102 to communicate with the server computing device 106. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for automatic execution of subscription-based financial instrument trading strategies in real-time as described herein. The server computing device 106 includes a user interface module 108 and a trading strategy subscription and execution module 110 that execute on the processor of the server computing device 106. In some embodiments, the modules 108, 110 are specialized sets of computer software instructions programmed onto one or more dedicated processors in the server computing device 106 and can include specifically-designated memory locations and/or registers for executing the specialized computer software instructions. The server computing device 106 further includes a trading strategy data cache 112. In some embodiments, the trading strategy data cache 112 comprises a local memory area that stores trading strategy data for use by the modules 108, 110 in a fast and efficient manner. In some embodiments, the trading strategy data cache 112 is a high-performance, low-latency memory storage area that is used by the trading strategy subscription and execution module 110 and the user interface module 108 to quickly retrieve and store data elements used in the process of creating new trading strategies and backtests, subscribing to existing trading strategies, and executing simulated or actual trades based upon the aforementioned trading strategies.

Although the computing modules 108, 110 and the cache 112 are shown in FIG. 1 as executing within the same server computing device 106, in some embodiments the functionality of the computing modules 108, 110 and the cache 112 can be distributed among a plurality of server computing devices. As shown in FIG. 1, the server computing device 106 enables the computing modules 108, 110 and the cache 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the computing modules 108, 110 and the cache 112 is described in detail throughout this specification.

The database 114 is a computing device (or in some embodiments, a set of computing devices) coupled to the server computing device 106 (in some embodiments, via communications network 104) and is configured to receive, generate, and store specific segments of data relating to the process of automatic execution of subscription-based financial instrument trading strategies in real-time as described herein. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below.

In some embodiments, the database 114 comprises trading strategy subscription data 116 and backtest data 118. Generally, the trading strategy subscription data 116 comprises data and metadata associated with one or more trading strategies that have been created by one or more users of the system 100. The trading strategy subscription data 116 can include, but is not limited to, one or more indicators used to deploy a trading strategy. As can be appreciated, these indicators can comprise technical indicators used by analysts and traders to predict future financial instrument price movements. Exemplary technical indicators include heuristic or mathematical calculations based on the price, volume, or open interest of a security or other financial instrument. Typically, technical indicators are based upon historical trading data for the security (e.g., price, volume, etc.). The trading strategy subscription data 116 can also include market data associated with one or more securities or financial instruments, such as ticker symbol, open price, close price, high price, low price, daily trading volume, percent change in price. In some embodiments, the market data comprises real-time data associated with current trading activity from one or more exchanges or markets. The trading strategy subscription data 116 can also include strategy details for one or more subscription-based trading strategies created by users of the system 100. In some embodiments, the trading strategy details can comprise a strategy name and one or more strategy parameters (e.g., security identifier such as ticker symbol, indicator(s), time period, etc.) used to deploy the corresponding trading strategy.

Generally, the backtest data 118 comprises one or more data elements associated with backtests performed using one or more of the trading strategies. As can be appreciated, backtesting is a process that uses historical trading data to assess the viability, risk, and/or profitability associated with a proposed trading strategy. Essentially, a backtest aims to determine whether a proposed trading strategy would have performed well or poorly based upon historical trading data. These results can inform whether the proposed trading strategy should be deployed going forward or instead whether it should be altered or rejected.

The trading execution platform 120 comprises one or more computing devices (such as server computing devices) that are coupled to the server computing device 106 in order to receive trade execution signals from the trading strategy subscription and execution module 110 and execute one or more trades of financial instruments based upon the trade execution signals for, e.g., a particular user or users of the system 100. For example, the trading strategy subscription and execution module 110 issues a trading signal (e.g., instructions to execute a trade) along with a trade price, trade quantity, and/or other data such as user identifier, account identifier, etc., to the trading execution platform 120. The trading execution platform 120 performs one or more transactions (e.g., buy transactions, sell transactions, asset transfer transactions, and the like) in order to carry out the trade identified in the trading signal. In some embodiments, the trading execution platform 120 communicates with the client computing device 102 at one or more points during execution of the trade. For example, the trading execution platform 120 can transmit a trade alert to the client computing device 102 which notifies a user of the client computing device 102 that a trade based upon a particular trading strategy has been executed or will be executed in the near future (e.g., because market conditions match one or more indicators defined in a trading strategy set up by the user). In some embodiments, the notification can comprise a request for the user of client computing device 102 to confirm that execution of the trade is authorized. The client computing device 102 can transmit a message in response to the notification that confirms the trade is authorized and should be executed. Upon completion of the trade transaction(s), the trading execution platform 120 can transmit a message to the client computing device 102 (e.g., via text, email, call, etc.) with details regarding the trade execution.

In some embodiments, the trading execution platform 120 can simulate execution of one or more trades based upon the trading signal and related data received from the trading strategy subscription and execution module 110. For example, the trading strategy subscription and execution module 110 can instruct the trading execution platform 120 to simulate the outcome of a particular trade using the trading signal and associated trade details (e.g., based upon actual market data such as price) and transmit the simulated outcome to the client computing device 102. In this way, a user at client computing device 102 can use the trading execution platform 120 to determine whether a trade should be executed according to a particular trading strategy.

Figure 2:
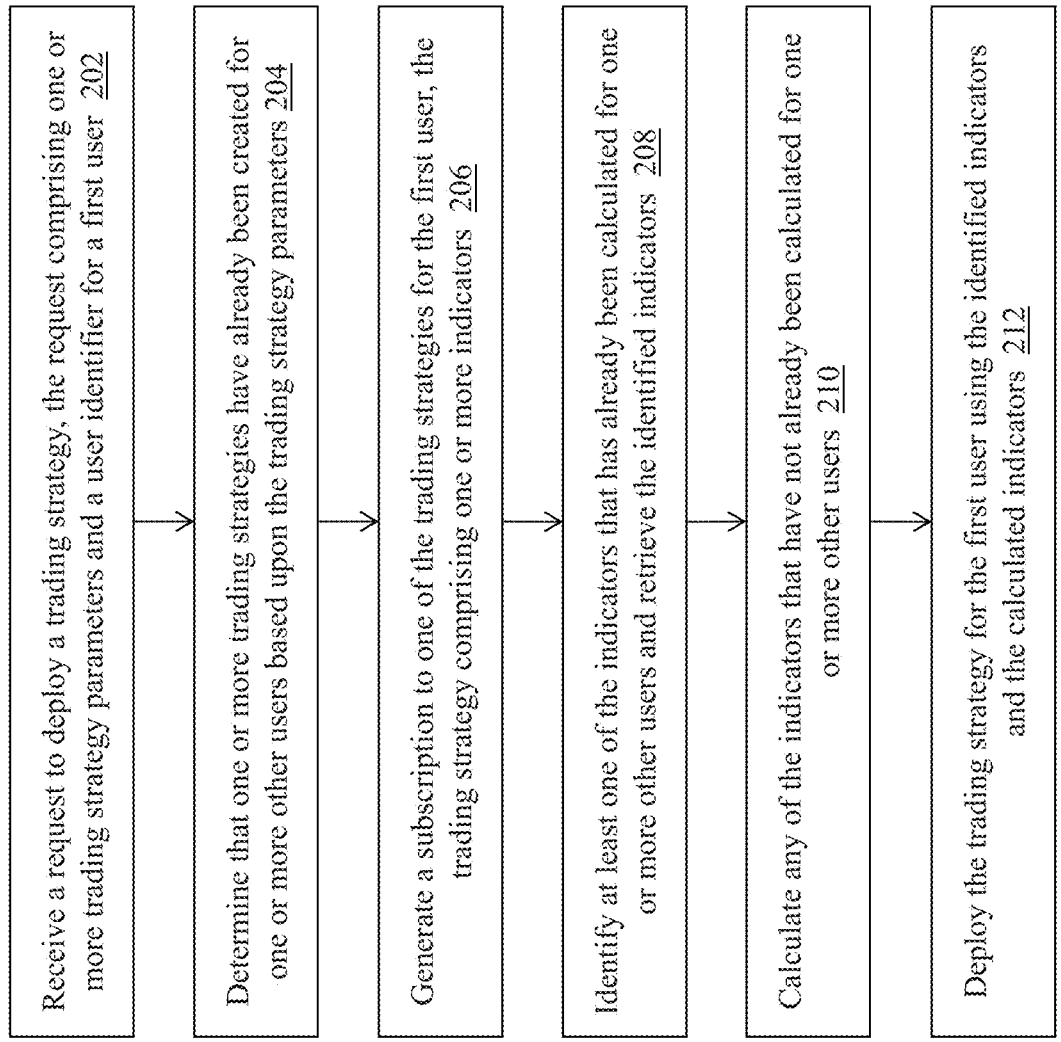
FIG. 2 is a flow diagram of a computerized method of automatic deployment of subscription-based financial instrument trading strategies in real-time.

FIG. 2 is a flow diagram of a computerized method 200 of automatic deployment of subscription-based financial instrument trading strategies in real-time, using the system 100 of FIG. 1. FIG. 3 is a flow diagram of a computerized method 300 of execution of the automatically-deployed subscription-based financial instrument trading strategies in real-time, using the system 100 of FIG. 1. It should be appreciated that, prior to deploying and executing a trading strategy as shown in FIGS. 2 and 3, a user at client computing device 102 can use the system 100 to analyze the historical and/or predicted performance of specific financial instruments and securities to determine which trading strategies to deploy. A user at client computing device 102 can log into a native application and/or a browser application to interact with user interface module 108 of server computing device 106 via network 104. For example, the user may have a trading account with an entity that operates the server computing device 106 and the user can log into that account in order to generate new trading strategies, subscribe to existing trading strategies, review market data and account data, and execute trades, among other functions.

Figure 4A:
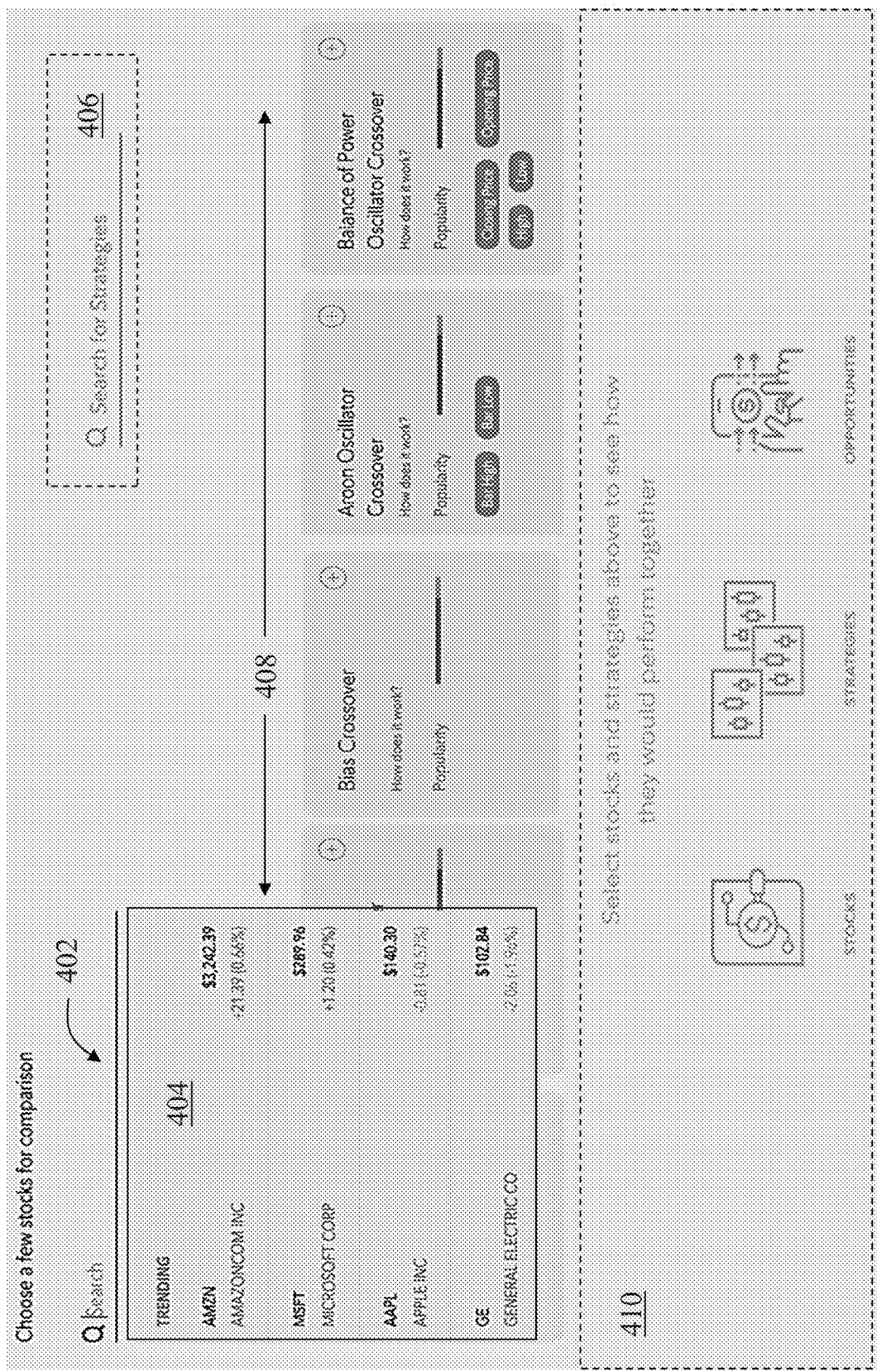
FIG. 4A is a diagram of an exemplary user interface generated by the user interface module for a trading strategy search dashboard.

Upon logging into the application, the user interface module 108 can transmit one or more user interface elements and corresponding data to client computing device 102 for display to the user. In one example, the user interface module 108 can generate a user interface screen comprising a search dashboard for the user to interact with the server computing device 106 and the trading execution platform 120. FIG. 4A is a diagram of an exemplary user interface 400 for a search dashboard generated by the user interface module 108. As shown in FIG. 4A, the search dashboard 400 comprises a stock search input box 402, a drop-down search results box 404, a trading strategy search input box 406, a plurality of trading strategy cards (collectively, 408) arranged in the center of the user interface, and a results section 410 at the bottom of the user interface. As can be appreciated, a user can enter one or more search terms into the search input box 402 (such as company names, ticker symbols, etc.) and/or the trading strategy search input box 406 (such as keywords for strategies) and the user interface module 108 can retrieve one or more search results based upon the search terms entered by the user and display the search results in results section 410. In some embodiments, the stock search input box 402 provides for autocomplete search functionality where the user interface module 108 retrieves suggested stocks and displays them in drop-down search results box 404 after each character is input by the user. The user can select one or more results from the drop-down box 404 (e.g., by clicking on the applicable area of the drop-down box 404) and the selected results can be populated into the user interface (e.g., in results section 410). The trading strategy search input box 406 can comprise similar autocomplete functionality (not shown).

Figure 4B:
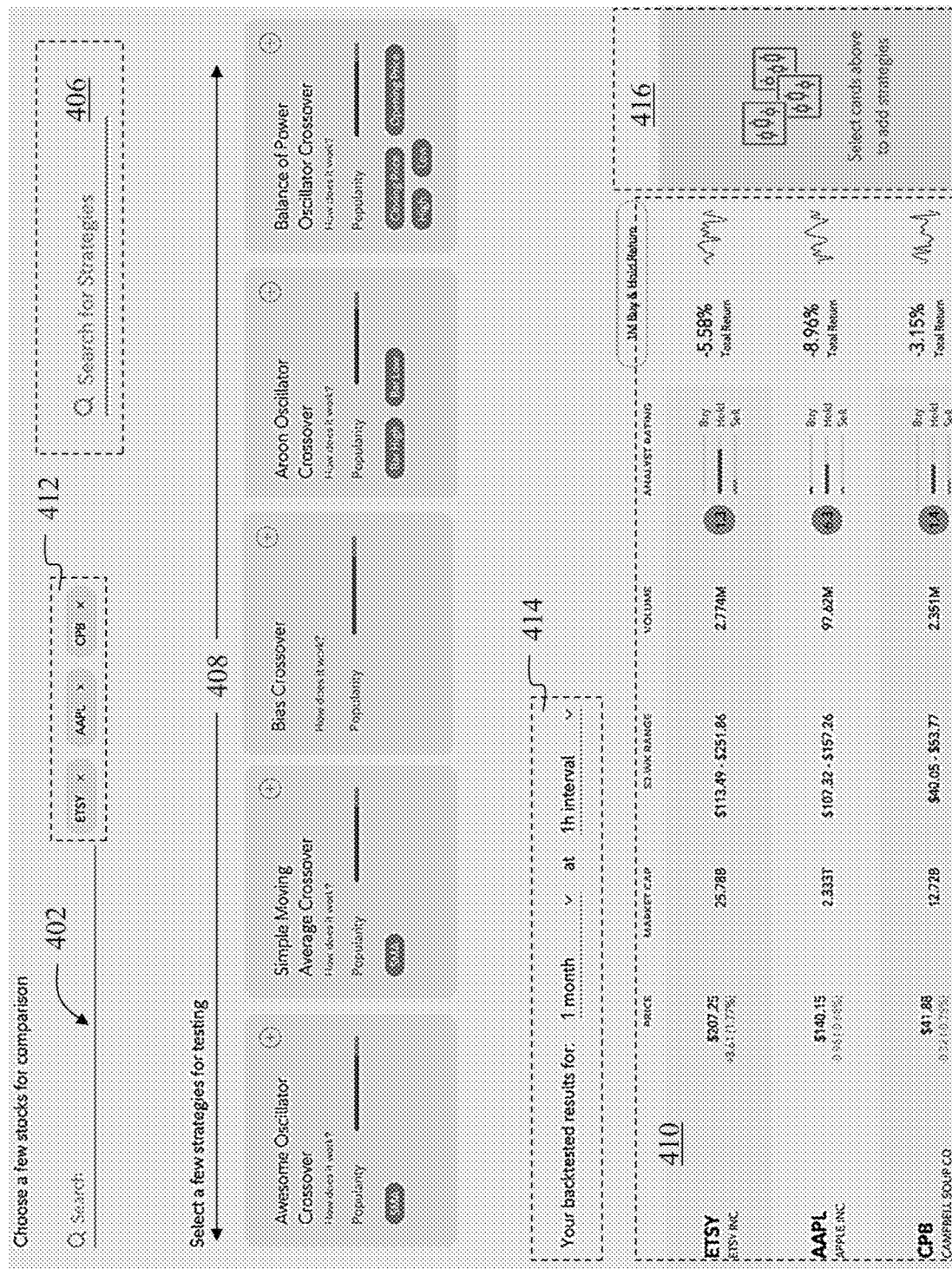
FIG. 4B is a diagram of the exemplary user interface for the trading strategy search dashboard generated by the user interface module showing how the selected stock results are populated into the user interface

FIG. 4B is a diagram of the exemplary user interface 400 for the search dashboard showing how the selected stock results are populated into the user interface. The search terms entered by the user are displayed in area 410 near the search input box 402. As shown in FIG. 4B, the user has searched for the stock symbols ETSY, AAPL, and CPB, and a search result indicator is displayed in 412 for each stock selection. The user can click on the cancel feature ('x') in each search result indicator to remove the search result from being displayed on screen. For each search result, the user interface 400 displays relevant market details for each stock symbol in the results area 410 at the bottom of the screen. In the example shown in FIG. 4B, the results area 410 contains information such as price, market cap, 52-week range, volume, analyst rating, and 1M buy & hold return for each stock symbol selected by the user. The buy and hold return values are determined using backtesting according to specific parameters selected by the user—as shown in FIG. 4B, the backtest parameter selection feature 414 enables the user to select parameters for the system to use in determining the return values. The user can change these parameters at any time and the system automatically updates the backtests supporting the return values and displays updated return values.

As can be appreciated, after selecting one or more stocks as described above, the user is able to also select trading strategies using the trading strategy search input box 406 and the trading strategy cards 408 to dynamically generate customized trading strategy evaluations (i.e., to see how stocks and strategies would perform together). The user interface 400 includes an indicator 416 to instruct the user to select one or more trading strategy cards 408 to apply the selected trading strategies to the selected stocks.

Figure 4C:
FIG. 4C is a diagram of an exemplary trading strategy card generated by the user interface module.

Each of the plurality of trading strategy cards 408 arranged at the center of the interface represents an individual trading strategy that may incorporate different indicators used to deploy the trading strategy. FIG. 4C is a diagram of an exemplary trading strategy card 450. The card 450 includes certain information relating to the trading strategy, such as name 452, ratings 454 relating to e.g., complexity of the strategy and popularity of the strategy with other users, and indicators 456 used by the strategy, an add button 458 used to select the trading strategy for testing and/or deployment, and a link 460 (e.g., 'How does it work?') that can be activated by the user to learn more details about the strategy. In this example, the trading strategy has a high popularity rating 454, and uses the simple moving average (SMA) indicator 456.

FIG. 4D is a diagram of an exemplary trading strategy detail window 470 generated by the user interface module 108 when a user activates the link 460. As shown in FIG. 4D, the trading strategy detail window 470 incudes the name of the trading strategy 472, a description of how the trading strategy works 474, and a descriptor of market conditions or activities for which the strategy is commonly used 476.

Figure 5:
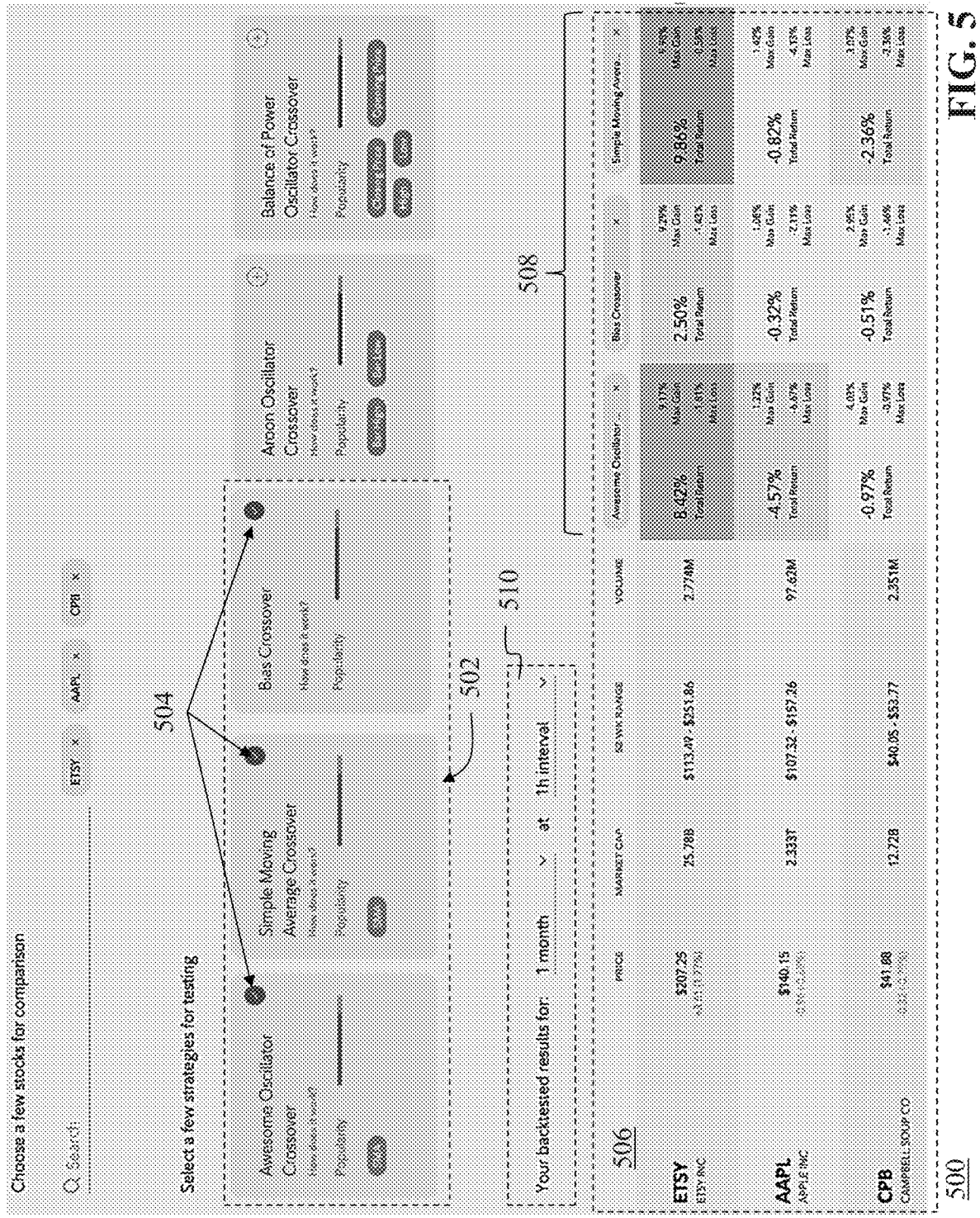
FIG. 5 is a diagram of an exemplary user interface showing backtest results for specifically-selected stocks and trading strategies.

The user can select one or more trading strategies to compare (and potentially deploy) using the selected search results (e.g., by clicking the add button 458 of FIG. 4C on each trading strategy tile that he or she wants to review). The trading strategy subscription and execution module 110 captures the search results and the selected trading strategies and automatically executes one or more backtests using the search results and selected trading strategies and displays the backtest results immediately to the user of the client computing device 102 via the user interface module 108. FIG. 5 is a diagram of an exemplary user interface 500 showing backtest results for specifically-selected stocks and trading strategies, automatically generated by the trading strategy subscription and execution module 110. As shown in FIG. 5, the user at client computing device 102 has selected a plurality of trading strategy cards 502 (as indicated by the checkmark 504 in the cards for 'Awesome Oscillator Crossover,' 'Simple Moving Average Crossover,' and 'Bias Crossover'). Upon receiving notification of the selection(s), the trading strategy subscription and execution module 110 immediately executes one or more backtests on historical trading data using the selected stocks and trading strategies, and the user interface module 108 generates an interface that displays the backtest results 508, e.g., in the results section 506 at the bottom of the interface. The results 508 can include, e.g., a total return (in percent), max gain, and max loss for the particular trading strategy backtest. The backtest results 508 can be color-coded according to the outcome—in one example, backtests that result in a total return above a first threshold can be colored green, while backtests that result in a total return below a second threshold can be colored red, with backtests that results in a total return between the first and second thresholds can be colored yellow. It should be appreciated that other types of dynamic graphical interface options can be used in the user interface to indicate performance, total returns, etc. associated with the backtests. As can be appreciated, the user can interact with the backtest parameter selection feature 510 to adjust desired backtest parameters, and the system automatically updates the backtest result values in section 508 accordingly, in real time.

Figure 6A:
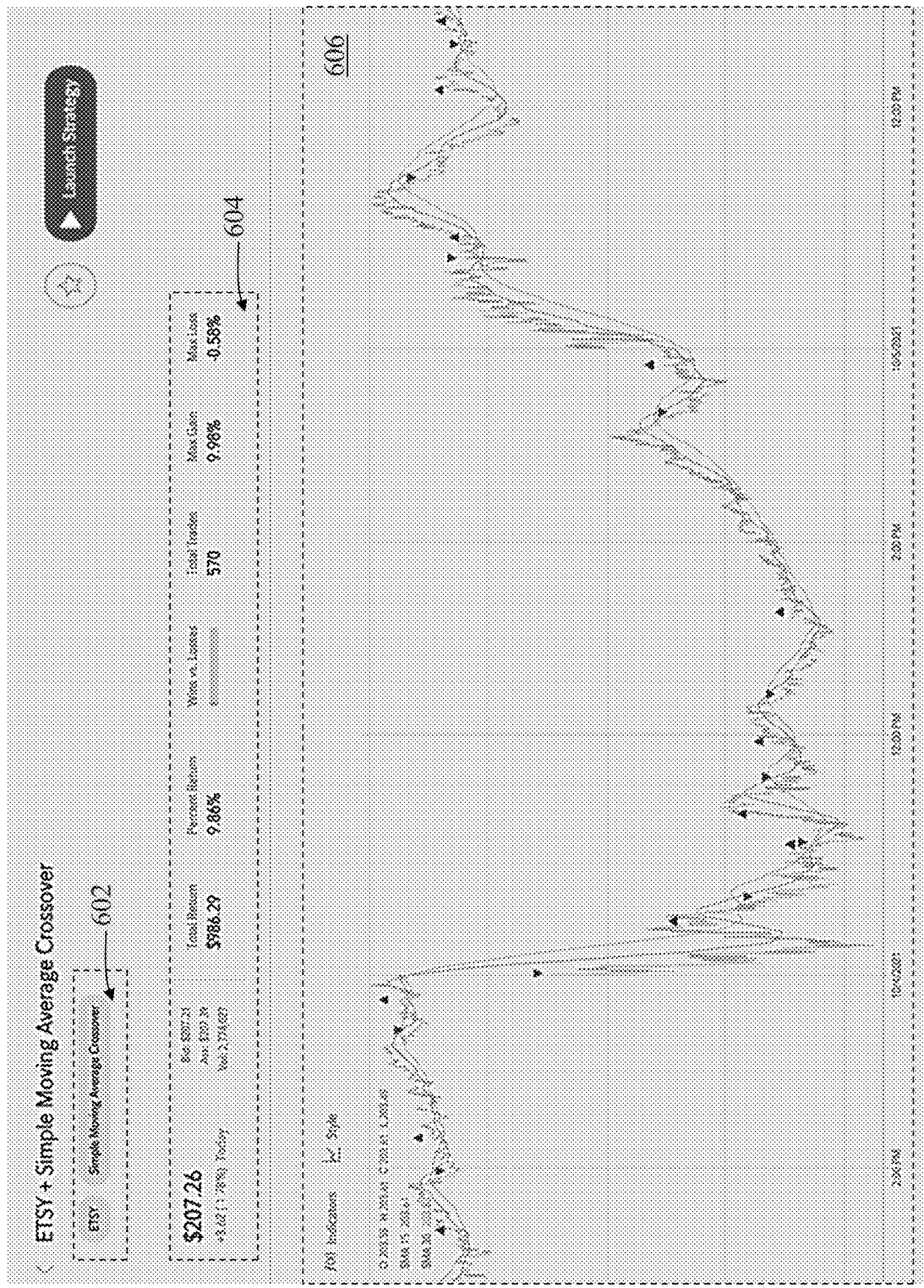
FIG. 6A is a diagram of an exemplary user interface generated by the user interface module showing backtest result details.
Figure 6B:
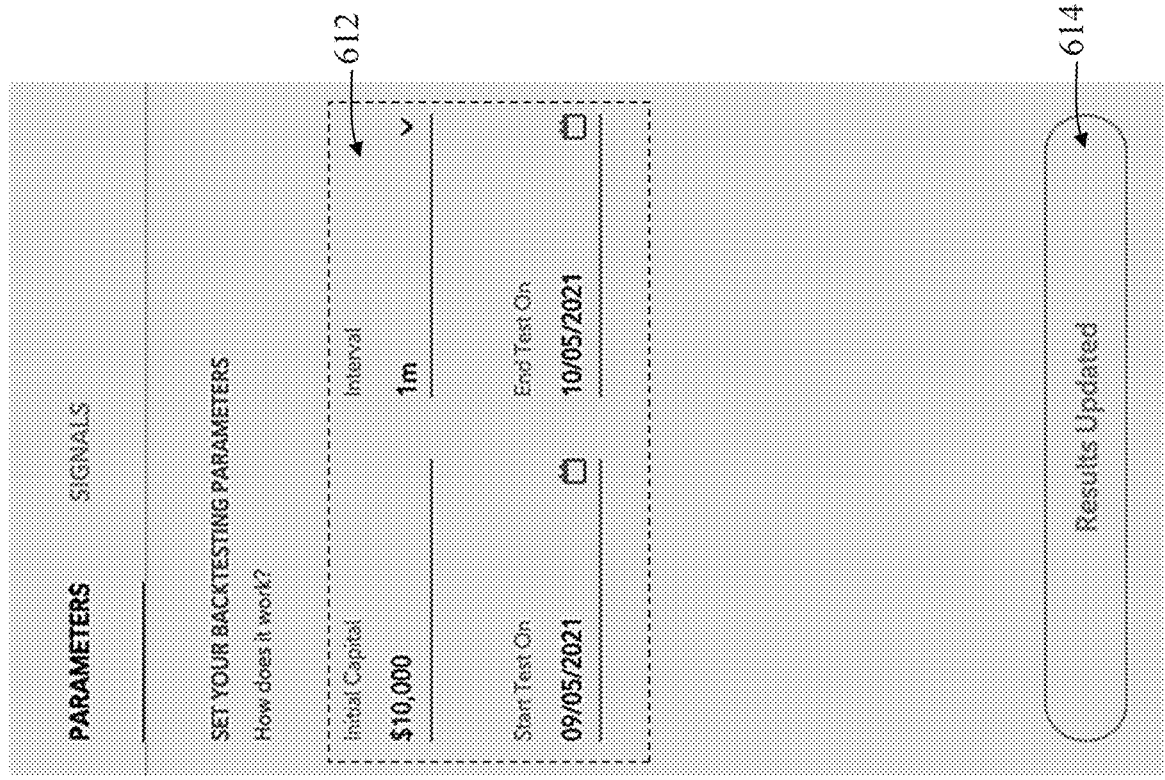
FIG. 6B is a diagram of an exemplary parameter selection user interface to dynamically adjust certain parameters used to execute a backtest.

The user can click on one or more of the backtests in the backtest results 508 to see further details about performance of a specific backtest and to change features for the backtest, such as granularity, time period, and the like. FIG. 6A is a diagram of an exemplary user interface 600 showing backtest result details automatically generated by the trading strategy subscription and execution module 110. As shown in FIG. 6A, the user interface 600 includes an indication 602 of the specifically selected stock symbols (e.g., the ETSY stock symbol) and selected trading strategies (e.g., the SMA Crossover strategy), a plurality of calculated values 604 associated with the backtest execution (such as total return, percent return, wins v. losses, total trades, max gain and max loss), and a price chart 606 for the backtest. FIG. 6B is a diagram of an exemplary parameter selection user interface 608 for the user to dynamically enter and adjust certain parameters used by the module 110 to execute the backtest. As can be appreciated, the parameter selection user interface 608 can be displayed alongside the user interface 600 and/or as a pop-up window on top of the user interface 600.

As shown in FIG. 6B, the parameter selection user interface 608 comprises input features 612 (e.g., initial capital, interval, start test date, end test date) that the user can interact with and change in order to adjust the backtest. The user interface also includes a button 614 used to re-execute the backtest after changing the parameters. In one example, a user at client computing device 102 can view the backtest results for a particular trading strategy and financial instrument combination, and dynamically adjust the parameters used to perform the backtest—which re-generates the backtest results according to the adjustments. FIG. 6C is a diagram of an exemplary signal user interface 616 for the user to view signals 618 (e.g., transactions or trades) generated by the module 110 as part of the backtest. The signal user interface 616 displays the transactions performed as part of the backtest. Using the signal user interface 616, the user at client computing device 102 can quickly see the sequence and timing of buy and sell orders 618 that were executed during the backtest process. The results of the backtesting process can be stored as backtest data 118 in database 114—so that the system 100 has access to the generated backtest data for subsequent backtests and/or other users. In some embodiments, the trading strategy subscription and execution module 110 can store at least a portion of the backtest data and/or backtest results in the trading strategy data cache 112 to enable rapid retrieval, calculation and adjustment of the backtest data.

It should be appreciated that a key feature provided by the methods and systems described herein is the ability for the system 100 to automatically generate updated performance results for backtested trading strategies and to deploy particular trading strategies that are customized according to the user's specific targets, such as securities, financial instruments, etc. However, it should also be appreciated that generation, testing, and deployment of trading strategies for individual users can result in significant processing overhead for the server computing device 106 and related systems—which could lead to bottlenecks, latency, and other technical issues that cause undesirable delays in generating and deploying trading strategies. Advantageously, the systems and methods described herein overcome this drawback through the implementation of a subscription-based trading strategy model in conjunction with a high-speed, low latency cache (i.e., trading strategy data cache 112 on server computing device 106) that leverages trading strategies previously generated by other users—including in some cases reusing one or more underlying calculations and indicators that make up the trading strategies—in order to more quickly and efficiently provide users with actionable trading strategy information and to rapidly deploy trading strategies that may be common to multiple users or contain data elements in which a number of different users are commonly interested.

Generally, the trading strategy subscription and execution module 110 utilizes a subscription-based paradigm, where client computing devices 102 and/or users of client computing devices 102 are configured to subscribe to specific trading strategies that are made available on the trading strategy subscription and execution module 110. These trading strategies can be pre-built by operators of the system 100 (e.g., a baseline or default set of popular or commonly-requested trading strategies) and/or the trading strategies can be previously created by one or more other users of the system 100 and stored for subsequent use. As can be understood, each trading strategy incorporates one or more data elements—such as technical indicators, market data, and other strategy parameters—that are used to simulate, evaluate, and/or execute the trading strategy. Due to the critical need for the trading strategy to reflect real-time data and variables (so that accurate and timely transactions can be executed on current market conditions), one approach could be to retrieve and re-calculate data elements for the trading strategy for each user or client computing device 102 that requests testing and/or deployment of the trading strategy. However, this approach suffers from imposing significant processing overhead and bandwidth requirements on the system 100 which directly impacts the speed and efficiency at which the system 100 can respond to and act upon trading requests.

Instead, the subscription-based paradigm of the trading strategy subscription and execution module 110 advantageously determines whether a requested trading strategy has already been deployed or generated (e.g., by one or more other users) based upon certain elements of the request—such as ticker symbols, indicators, and other parameters provided by the client computing device 102. Turning back to FIGS. 2 and 3, the trading strategy subscription and execution module 110 receives (step 202) a request to deploy a trading strategy from the client computing device 102. As described above, the user at client computing device 102 can establish a communication session with the server computing device 106 (e.g., by authenticating to the server computing device 106) and evaluate trading strategies and ticker symbols as set forth previously. When the user decides to deploy one or more trading strategies, in some embodiments the user can click the "Launch Strategy" button (see FIG. 6A) to deploy the corresponding trading strategy.

Figure 7A:
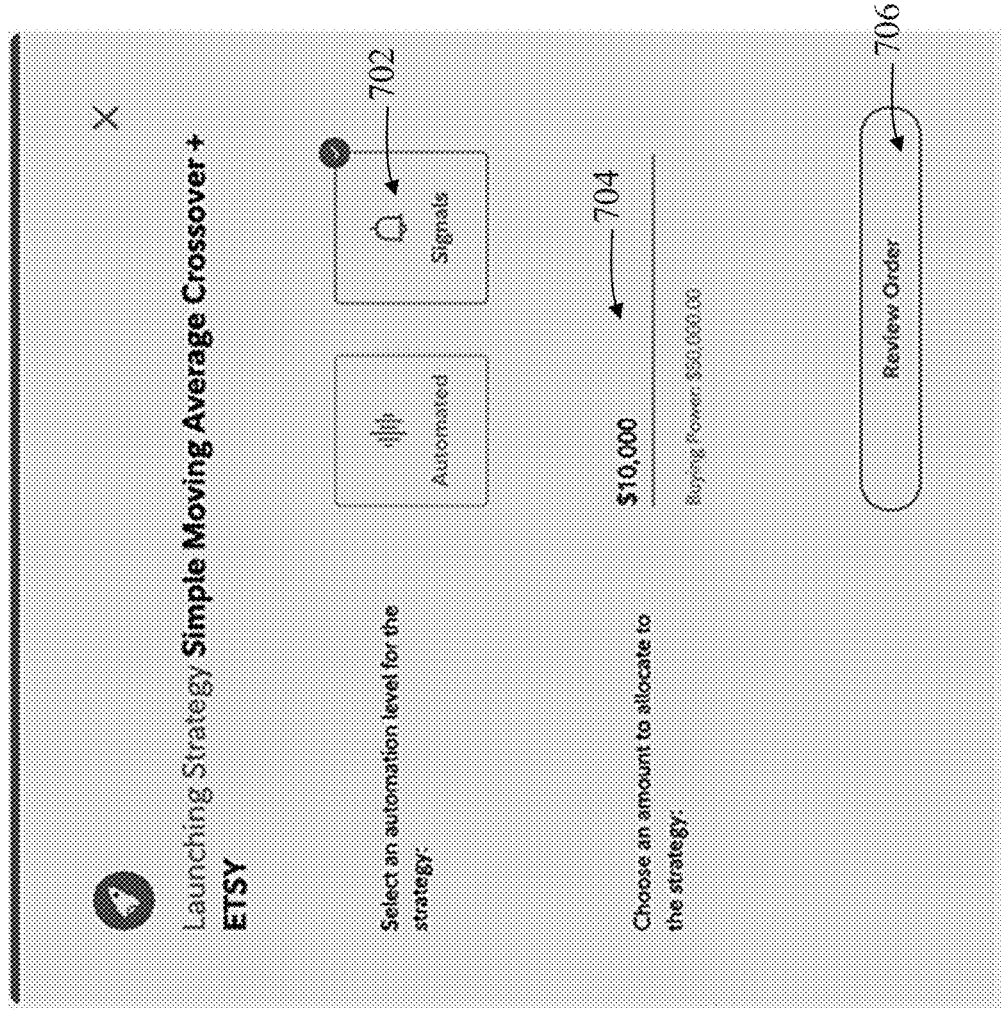
FIG. 7A is a diagram of an exemplary user interface generated by the user interface module for user review of trading strategy deployment using signals-based deployment.
Figure 7B:
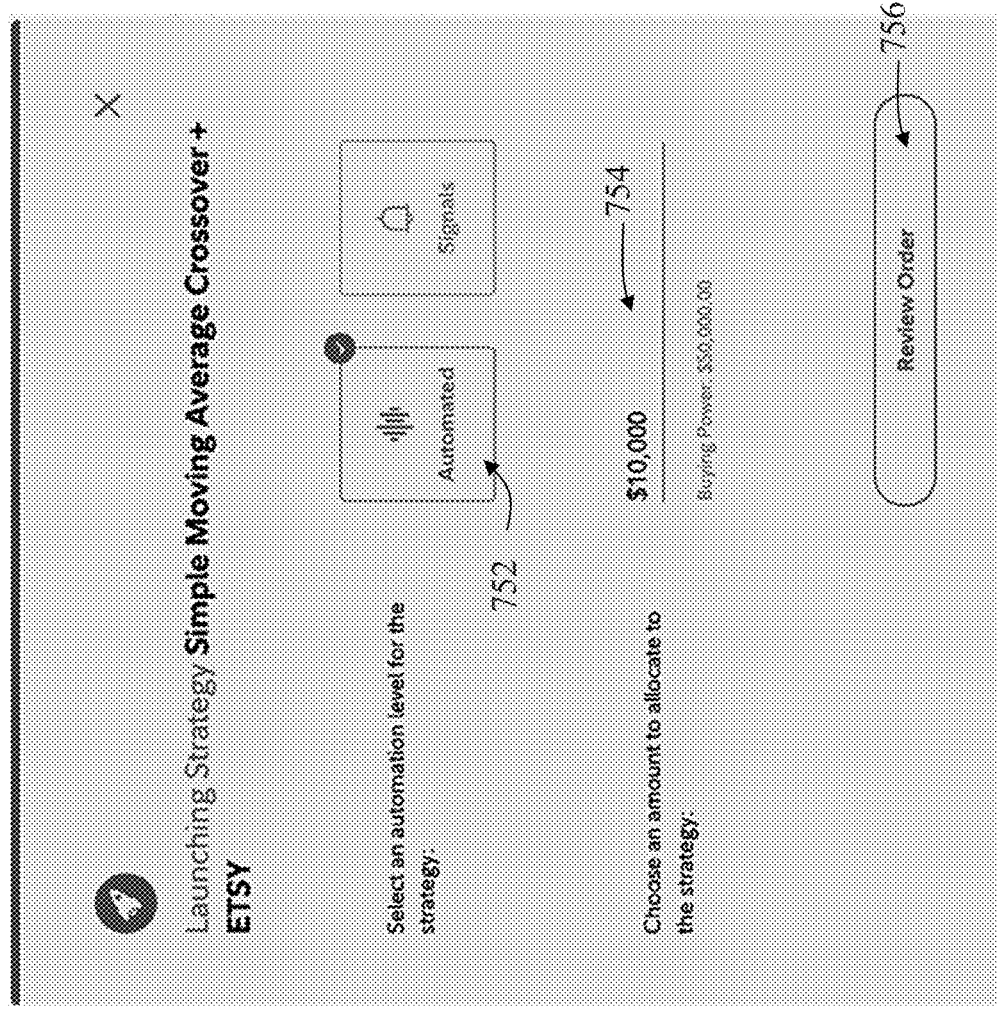
FIG. 7B is a diagram of an exemplary user interface generated by the user interface module for user review of review of trading strategy deployment using automated deployment.

In some embodiments, after the user clicks the "Launch Strategy" button, the user interface module 108 generates one or more user interface screens so that the user can review and confirm deployment of the strategy. FIG. 7A is a diagram of an exemplary user interface 700 for user review of trading strategy deployment using signals-based deployment. As shown in FIG. 7A, the user interface 700 shows that the user has selected an automation level 702 (e.g., 'Signals') and the user designates a funding amount 704 to be allocated to the strategy. The Signals automation level denotes that the deployed trading strategy is evaluated by the module 110 at intervals defined by the user (granularity) to determine whether to generate a buy/sell trading signal. If the user instead wants to deploy the strategy using automated deployment, the user can select the 'Automated' feature. FIG. 7B is a diagram of an exemplary user interface 750 for user review of review of trading strategy deployment using automated deployment. Automated deployment denotes that the deployed trading strategy is evaluated by the module 110 at intervals defined by the user (granularity) to determine whether to generate a buy/sell trading signal. When a trading signal is generated, the module 110 automatically transmits programmatic instructions to the trading execution platform 120 for execution of the corresponding transaction against the user's account As shown in FIG. 7B, the user has selected the 'Automated' level 752 and designated a funding amount 754 to be allocated to the strategy.

Figure 7C:
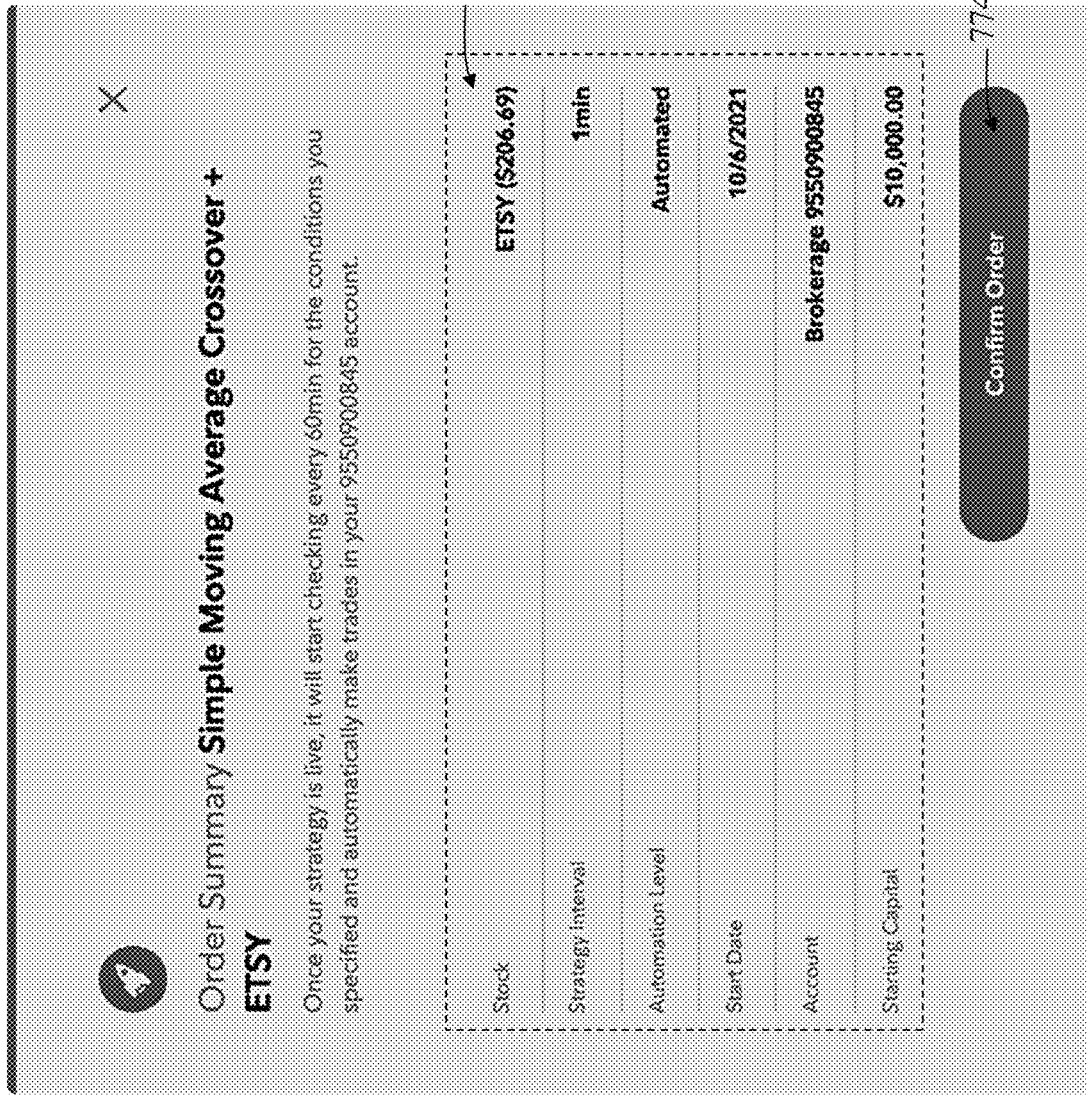
FIG. 7C is a diagram of an exemplary confirmation user interface generated by the user interface module.

Once the user is satisfied with the selections, the user can select the 'Review Order' button (e.g., button 706 in FIG. 7A or button 756 in FIG. 7B). The user interface module 108 generates a confirmation user interface to display the specific deployment details for the trading strategy and ask the user to authorize deployment of the strategy. FIG. 7C is a diagram of an exemplary confirmation user interface 770. As shown in FIG. 7C, the confirmation user interface 770 provides a summary of the trading strategy deployment features 772 (e.g., stock ticker, strategy interval, automation level, start date, account no., and starting capital amount) along with a 'Confirm Order' button 774. If the user is satisfied with the strategy features 772, the user can click the button 774 to deploy the trading strategy using the trading strategy subscription and execution module 110.

The client computing device 102 transmits the request to deploy the trading strategy or strategies to the module 110, where the request includes one or more trading strategy parameters (i.e., ticker symbol(s), technical indicators, etc.) and a user identifier for the user (i.e., user name, account number, other identifier). As an example, a user at client computing device 102 can request deployment of a trading strategy for the ticker symbol ETSY using a simple moving average (SMA) crossover indicator. When the trading strategy subscription and execution module 110 receives the request, the module 110 uses the parameters in the request to determine (step 204) that one or more trading strategies have already been created for one or more other users (and/or the current user of client computing device 102). In some embodiments, the module 110 searches the trading strategy data cache 112 and/or the trading strategy subscription data 116 of database 114 to identify one or more pre-configured trading strategies that include the same parameters (e.g., same ticker symbol(s), same indicator(s), etc.).

When the trading strategy subscription and execution module 110 identifies one or more matching trading strategies, the module 110 generates (step 206) a subscription to one of the trading strategies for the user of client computing device 102. In one example, the module 110 incorporates the user identifier from the request into a data structure in database 114 (e.g., as part of the trading strategy subscription data 116) that links the user identifier to the trading strategy (such as a mapping table).

As noted previously, the trading strategy comprises one or more indicators that are used to deploy the strategy and execute transactions based on the strategy. Once the trading strategy subscription and execution module 110 has generated the subscription for a particular trading strategy and user, the module 110 identifies (step 208) at least one of the indicators in the trading strategy that has already been calculated for one or more other users and retrieves the identified indicators. For example, the trading strategy data cache 112 can store a plurality of indicators used by various trading strategies and the module 110 can quickly determine that one or more indicators for the present trading strategy are stored in cache 112, ready for retrieval and use. Thus, the module 110 can quickly retrieve the already-calculated indicators from data cache 112, instead of having to regenerate any of the indicators. This process beneficially reduces processing time and latency in preparing the trading strategy for deployment.

In some embodiments, the trading strategy selected for deployment may include one or more indicators that have not been recently calculated or refreshed. The trading strategy subscription and execution module 110 calculates (step 210) any of the indicators that have not already been calculated for one or more other users. For example, the module 110 can retrieve applicable market data, indicator data, metadata, etc. from database 114 and/or one or more other data sources (not shown in FIG. 1) and calculate the indicators that are needed to deploy the trading strategy. Importantly, the module 110 can store the calculated indicators in cache 112 for subsequent use by other trading strategies if applicable.

Once the relevant indicators have been retrieved from cache 112 and/or calculated, trading strategy subscription and execution module 110 deploys (step 212) the trading strategy for the user of client computing device 102 using the identified indicators and the calculated indicators. Turning to FIG. 3, the module 110 analyzes (step 302) market data using one or more identified indicators or calculated indicators in the trading strategy to determine that a trade condition exists. As can be appreciated, once the trading strategy is deployed the module 110 can continually monitor market data and/or other data (e.g., as stored in cache 112 and/or retrieved from other sources) against the indicators and other conditions in the deployed trading strategy for the user to determine whether a trade condition exists. In this way, the module 110 provides automated trade identification and initialization without requiring action by the user.

When the trade condition exists (e.g., an indicator in the strategy is triggered), the trading strategy subscription and execution module 110 generates (step 304) a trading signal comprising one or more trade parameters from the trading strategy, for transmission to the trading execution platform 120. In some embodiments, the trading signal comprises programmatic instructions such as an API call that includes data used by the platform 120 to initiate a trade. For example, the user may have requested deployment of a trading strategy comprising a SMA one-minute crossover algorithm. In this example, the module 110 uses the previous 200 ticks, and calculates the 15- and 30-minute SMA for a given security or financial instrument. When the 15-minute SMA crosses above the 30-minute SMA, the module 110 generates a corresponding trading signal comprising a buy transaction and transmits (step 306) the trading signal to the trading execution platform 120. On the other hand, when the 15-minute SMA crosses below the 30-minute SMA, the module 110 generates a corresponding trading signal comprising a sell transaction and transmits the trading signal to the trading execution platform 120. In some embodiments, the trading signal comprises the user identifier, a funding amount (e.g., dollar value of shares to buy/sell), and/or a transaction amount (e.g., number of shares to buy/sell).

Upon receiving the trading signal, the trading execution platform 120 can carry out one or more transactions (such as equity trades, swaps, etc.) based upon the trading signal. In some embodiments, the trading strategy subscription and execution module 110 and the trading execution platform 120 can be configured to carry out the transactions in a variety of different ways depending on the preferences of the user at client computing device 102. In some embodiments, the trading strategy subscription and execution module 110 can simulate the requested transactions (also called paper trading)—where the module 110 evaluates the trading strategy at intervals defined by the user (granularity) to determine whether to generate a buy/sell trading signal. Once a buy/sell signal occurs, the system retrieves a most-recent stock price and calculates a quantity of shares to simulate a buy/sell transaction based on, e.g., a user-inputted hypothetical funding amount. The module 110 stores and tracks each simulated transaction, including the corresponding trade details such as ticker symbol, date, price, quantity, value, side (buy/sell). In some embodiments, the module 110 can transmit a simulated trade confirmation to client computing device 102 (e.g., text, email, messaging), to enable the user to understand the trading strategy's performance in real-time market conditions but without risking the user's own capital.

Figure 8A:
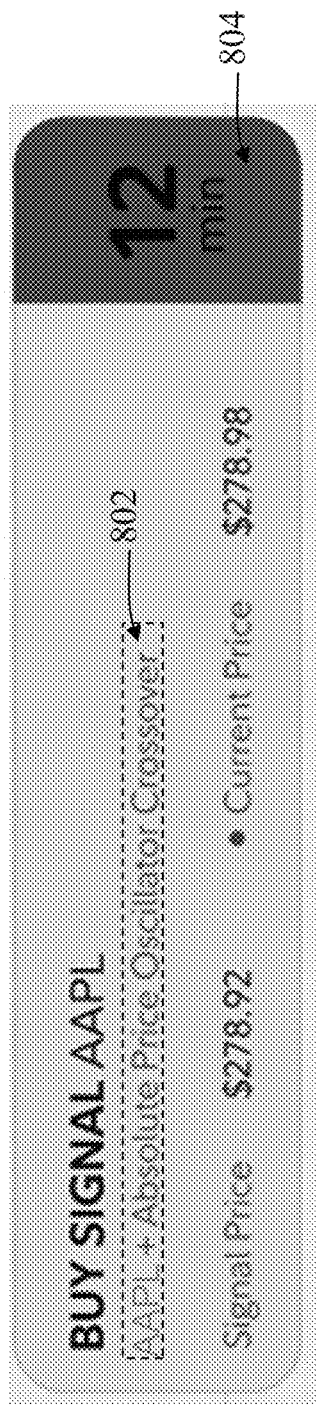
FIG. 8A is a diagram of an exemplary alert message generated by the user interface module.
Figure 8B:
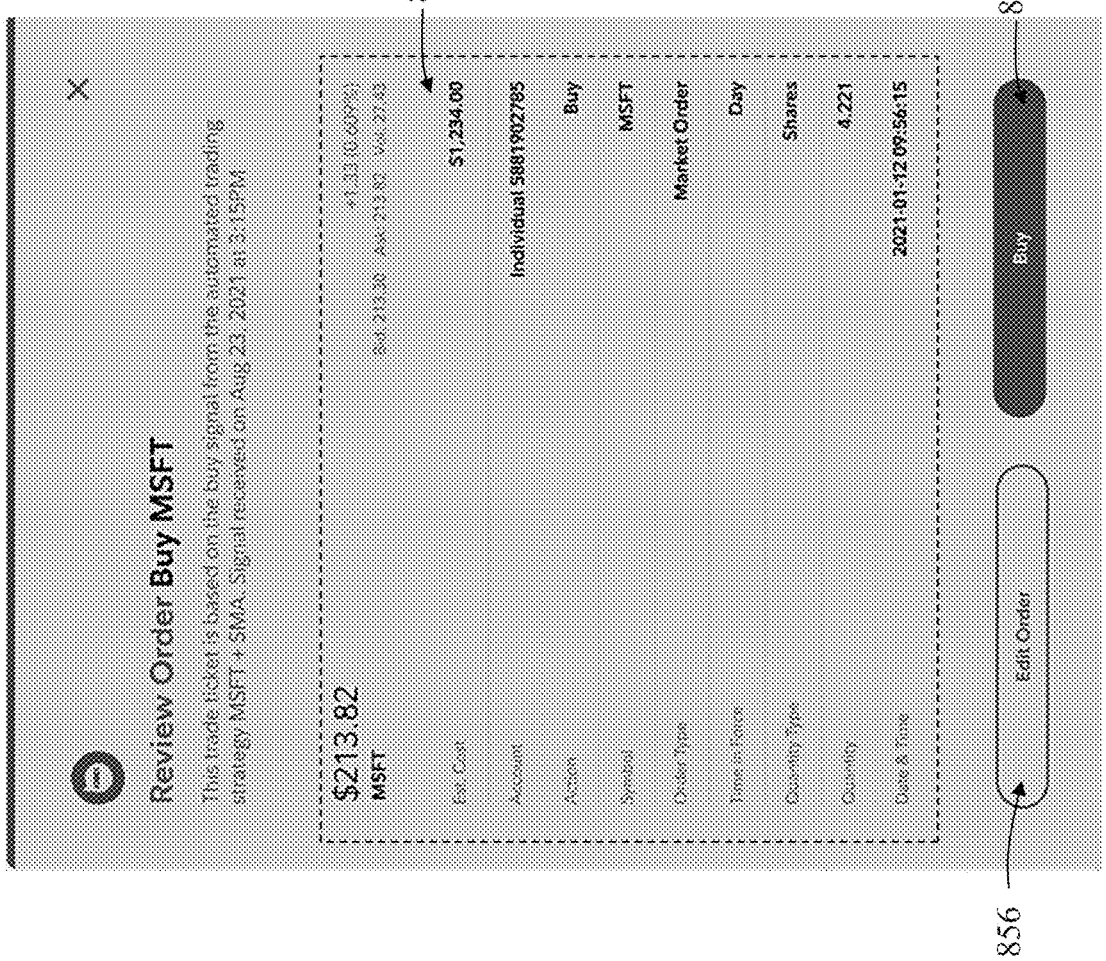
FIG. 8B is a diagram of an exemplary order review and execution interface generated by the user interface module.

In some embodiments, the trading strategy subscription and execution module 110 can implement alert-based trading—where the module 110 receives a funding amount from the user, and evaluates the trading strategy at intervals defined by the user (granularity) to determine whether to generate a buy/sell trading signal. When a trading signal is generated, the module 110 generates an alert message for transmission to the client computing device 102. FIG. 8A is a diagram of an exemplary alert message 800 displayed by the user interface module 108 to the user of client computing device 102. As shown in FIG. 8A, the alert message 800 informs the user that trading conditions set forth in a deployed trading strategy 802 (e.g., AAPL+Absolute Price Oscillator Crossover) have been met and indicates details of the trade signal, such as signal type, (e.g., Buy) signal price and current price. In this example, the current price ($278.98) of AAPL stock has crossed over the signal price ($278.92), and the module 110 issues the alert message to the user interface module 108 to inform the user(s) that are subscribed to the trading strategy. The user interface 800 also provides a time indicator 804 (e.g., 12 minutes) of how long ago the signal was generated. In some embodiments, display of the alert message 800 is accompanied by an audible tone to direct the user's attention to the user interface. In some embodiments, the alert message 800 is displayed as a pop-up window on top of another user interface (e.g., user interfaces 400, 500, and/or 600), and the alert message 800 can fade away after a predetermined amount of time (e.g., 15 seconds). The user can interact with the alert message 800 to review the signal details and to act on the alert (e.g., by manually authorizing the corresponding transaction(s) for execution by the trading execution platform 120). FIG. 8B is a diagram of an exemplary order review and execution interface 850 displayed by the user interface module 108 to the user of client computing device 102. The interface 850 comprises trade order details 852 for the user to review and confirm, based upon the corresponding buy signal and alert message received by the user interface module 108. If the user decides to proceed with execution of the trade, the user can click the 'Buy' button 854 and the trading strategy subscription and execution module 110 submits the trade to the trading execution platform 120. The user can also change aspects of the order (e.g., account, quantity, order type, etc.) prior to submission by using the 'Edit Order' button 856. Although alerts of this nature are time-sensitive and less efficient than automated live trading, they do enable the user to build more comfort with the deployed trading strategy and the idea of automating subsequent transactions. In the alert-based trading mode, the trading strategy subscription and execution module 110 can track and store (i) manually-entered trades and their corresponding signals and (ii) missed trading signals (where an alert is generated but the user opts not to carry out the transaction).

In some embodiments, the trading strategy subscription and execution module 110 can implement automated live trading—where the module 110 receives a funding amount from the user, and evaluates the trading strategy at intervals defined by the user (granularity) to determine whether to generate a buy/sell trading signal. When a trading signal is generated, the module 110 automatically transmits programmatic instructions to the trading execution platform 120 for execution of the corresponding transaction against the user's account. In these embodiments, upon completion of the trade, the trading execution platform 120 can transmit a trade execution confirmation message to the client computing device 102 to inform the user about the details of the trade. The trading strategy subscription and execution module 110 and/or the trading execution platform 120 tracks and stores the trade details so that users can follow actual performance of deployed trading strategies in real-time. Due to the subscription-based nature of the trading strategies, users can seamlessly pause trading strategies such that the user remains subscribed to the strategy but the module 110 and/or platform 120 does not execute any live trades and/or generate alerts while the strategy is paused. In addition, users have the ability to unsubscribe from certain trading strategies which can remove the strategy from the user's trading portfolio and in some cases, liquidate the corresponding position(s) that the user has based on the strategy.

Figure 9A:
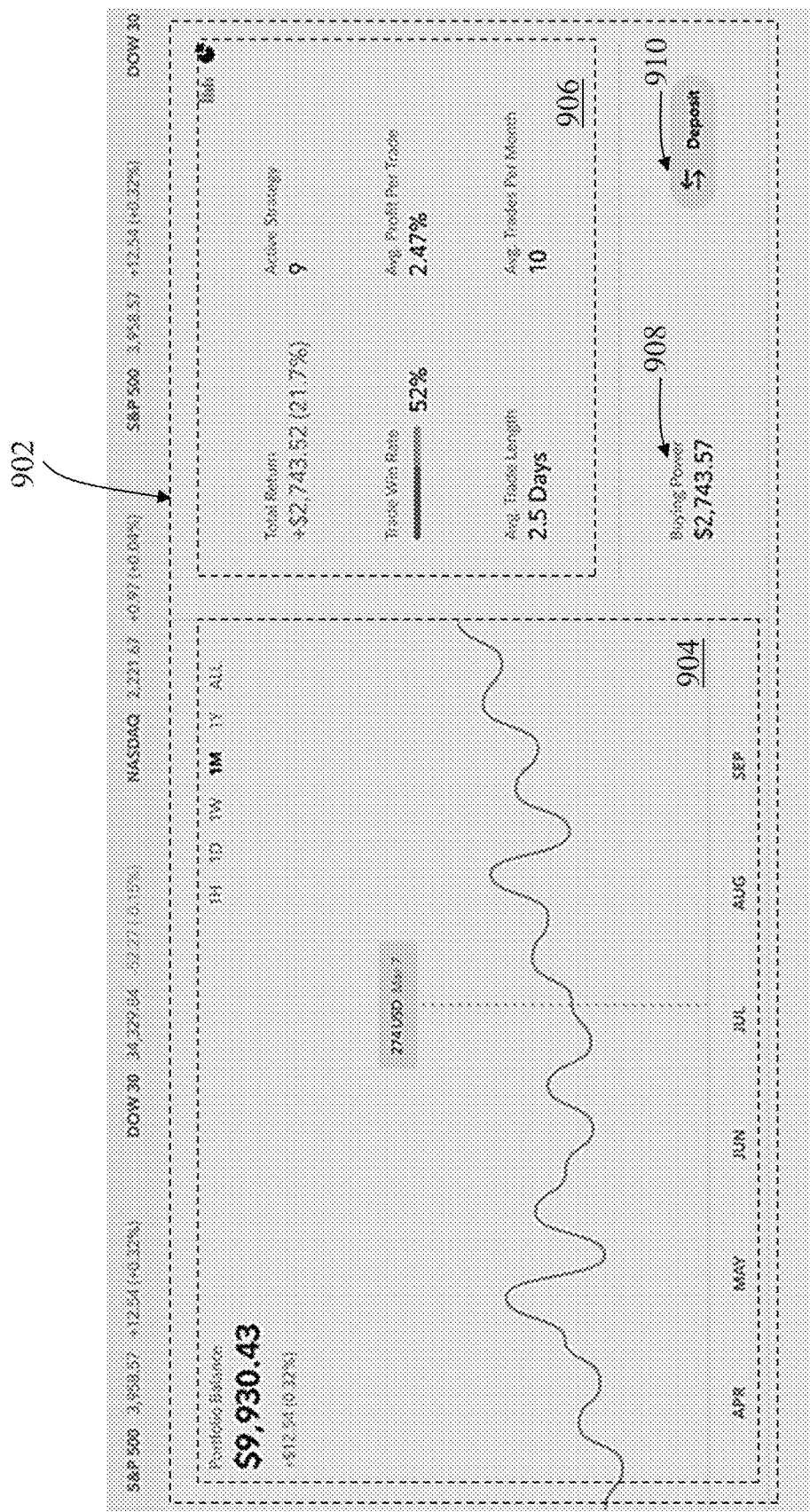
FIGS. 9A-9C are diagrams of portions of an exemplary portfolio dashboard user interface generated by the user interface module.
Figure 9B:
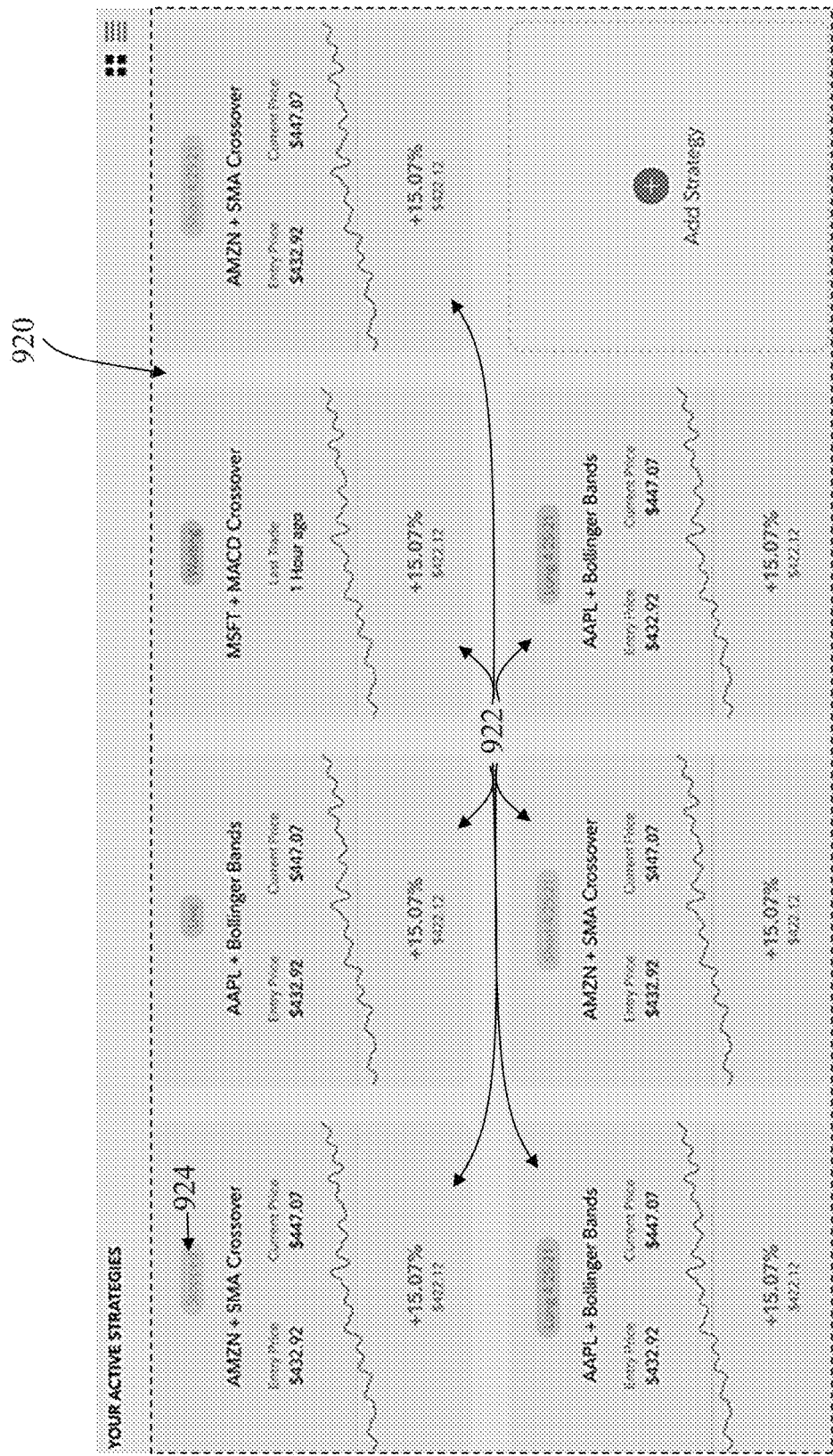
Figure 9C:
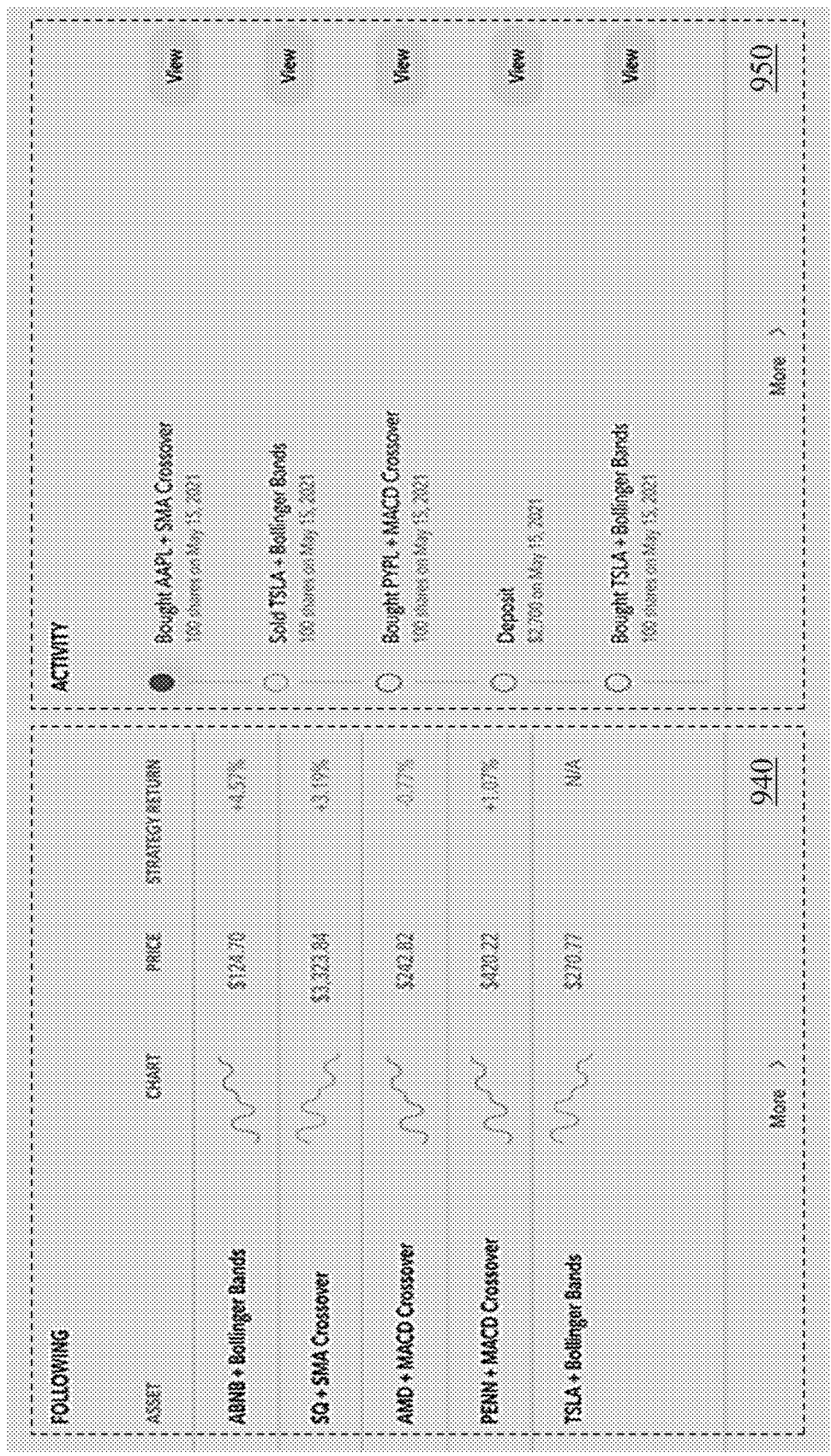

The system 100 can also generate a dashboard user interface for users to efficiently track cumulative performance for a plurality of different trading strategies—including deployed trading strategies and followed or simulated trading strategies. FIGS. 9A-9C are diagrams of portions of an exemplary dashboard user interface generated by the user interface module 108. As shown in FIG. 9A, a first portion of the user interface comprises a portfolio summary section 902 that includes data relating to the user's overall portfolio performance. This section 902 can include a graph 904 showing the user's portfolio performance during a designated time period (e.g., 1H, 1D, 1M, 1Y, ALL). The section 902 can also include specific data points 906 for the user's portfolio, such as total return, number of active strategies, trade win rate, average profit per trade, average trade length, and average trades per month. The section 902 can further includes the user's buying power 908 (e.g., how much is available for the user to allocate to trading strategies or trades) and a button 910 for the user to deposit additional funds into his or her account(s).

As shown in FIG. 9B, a second portion of the dashboard user interface comprises an active strategies section 920 that displays a plurality of strategy performance cards (collectively, 922) for trading strategies that are currently deployed by the user. The strategy performance cards 922 can display the strategy name, an entry price, a current price, a graph of price changes over time, and a percent return for the strategy. In addition, the strategy performance cards 922 can display a deployment indicator (e.g., 924) as to whether the strategy is live, stopped, waiting, or another deployment status (e.g., short, long, etc.) to provide the user with an easy-to-understand view of his or her deployed strategies.

As shown in FIG. 9C, a third portion of the dashboard user interface comprises a simulated strategy analysis section 940 and a historical activity section 950. The simulated strategy analysis section 940 comprises a list of trading strategies that the user is following or has run simulations on (meaning that the user has not actively deployed these strategies), while the historical activity section 950 comprises a chronological list of orders/trades that the user and/or the trading strategy subscription and execution module 110 has executed according to one or more of the deployed trading strategies for the user.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automatic execution of subscription-based financial instrument trading strategies in real-time, the system comprising a server computing device with a memory for storing computer-executable instructions and a processor that executes the computer-executable instructions to:
   receive, from a client computing device, a request to deploy a trading strategy, the request comprising one or more trading strategy parameters and a user identifier for a first user;
   determine that one or more trading strategies have already been created for one or more other users based upon the trading strategy parameters;
   generate a subscription to one of the trading strategies for the first user, the trading strategy comprising one or more indicators needed to deploy the trading strategy;
   identify at least one of the indicators needed to deploy the trading strategy that has already been calculated for one or more other users and retrieve the identified indicators from a cache;
   calculate any of the indicators needed to deploy the trading strategy that have not already been calculated for one or more other users and store the calculated indicators in the cache; and
   deploy the trading strategy for the first user using the identified indicators and the calculated indicators, including:
      analyzing market data using one or more identified indicators or calculated indicators in the trading strategy to determine that a trade condition exists,
      generating a trading signal comprising one or more trade parameters from the trading strategy, and
      transmitting the trading signal to a remote computing device for execution of a trade using the trade parameters.

2. The system of claim 1, wherein determining that one or more trading strategies have already been created for one or more other users based upon the trading strategy parameters comprises:
   identifying a plurality of trading strategies that have already been created for one or more other users based upon the trading strategy parameters;
   displaying the identified plurality of trading strategies on the client computing device; and receiving a selection of one of the identified plurality of trading strategies from the client computing device.

3. The system of claim 2, wherein displaying the identified plurality of trading strategies on the client computing device comprises:
executing a backtest on each identified trading strategy using a set of backtest parameters to generating backtest results for each identified trading strategy; and
displaying the backtest results for each identified trading strategy on the client computing device.

4. The system of claim 3, wherein executing a backtest on each identified trading strategy comprises:
determining that one or more calculations in the backtest for an identified trading strategy have already been generated for one or more other users;
retrieving the calculations in the backtest that have already been generated from the cache; and
executing the backtest on the identified trading strategy using the retrieved calculations.

5. The system of claim 2, wherein the identified plurality of trading strategies are displayed on the client computing device as tiles in a grid layout.

6. The system of claim 1, wherein transmitting the trading signal to a remote computing device for execution of a trade using the trade parameters comprises:
retrieving a trade price for at least one financial instrument identified in the trade parameters;
determining a trade quantity of the at least one financial instrument using the trade price; and
transmitting the trading signal, the trade price and the trade quantity to the remote computing device.

7. The system of claim 6, wherein the remote computing device simulates execution of the trade based upon the trading signal, the trade price and the trade quantity and displays a result of the simulated execution on the client computing device.

8. The system of claim 6, wherein the remote computing device generates a trade alert upon receiving the trading signal from the server computing device and transmits the trade alert to the client computing device.

9. The system of claim 8, wherein the remote computing device executes the trade upon receiving a message from the client computing device in response to the trade alert.

10. The system of claim 6, wherein the remote computing device executes the trade based upon the trade price and the trade quantity upon receiving the trading signal from the server computing device.

11. The system of claim 1, wherein the identified indicators are retrieved from the cache without re-calculating the identified indicators.

12. The system of claim 1, wherein the one or more trading strategy parameters comprise a stock symbol.

13. The system of claim 1, wherein the user identifier comprises an account number.

14. A computerized method of automatic execution of subscription-based financial instrument trading strategies in real-time, the method comprising:
receiving, by a server computing device from a client computing device, a request to deploy a trading strategy, the request comprising one or more trading strategy parameters and a user identifier for a first user;
determining, by the server computing device, that one or more trading strategies have already been created for one or more other users based upon the trading strategy parameters;
generating, by the server computing device, a subscription to one of the trading strategies for the first user, the trading strategy comprising one or more indicators needed to deploy the trading strategy;
identifying, by the server computing device, at least one of the indicators needed to deploy the trading strategy that has already been calculated for one or more other users and retrieve the identified indicators from a cache;
calculating, by the server computing device, any of the indicators needed to deploy the trading strategy that have not already been calculated for one or more other users and store the calculated indicators in the cache; and
deploying, by the server computing device, the trading strategy for the first user using the identified indicators and the calculated indicators, including:
analyzing market data using one or more identified indicators or calculated indicators in the trading strategy to determine that a trade condition exists,
generating a trading signal comprising one or more trade parameters from the trading strategy, and
transmitting the trading signal to a remote computing device for execution of a trade using the trade parameters.

15. The method of claim 14, wherein determining that one or more trading strategies have already been created for one or more other users based upon the trading strategy parameters comprises:
identifying a plurality of trading strategies that have already been created for one or more other users based upon the trading strategy parameters;
displaying the identified plurality of trading strategies on the client computing device; and
receiving a selection of one of the identified plurality of trading strategies from the client computing device.

16. The method of claim 15, wherein displaying the identified plurality of trading strategies on the client computing device comprises:
executing a backtest on each identified trading strategy using a set of backtest parameters to generating backtest results for each identified trading strategy; and
displaying the backtest results for each identified trading strategy on the client computing device.

17. The method of claim 16, wherein executing a backtest on each identified trading strategy comprises:
determining that one or more calculations in the backtest for an identified trading strategy have already been generated for one or more other users;
retrieving the calculations in the backtest that have already been generated from the cache; and
executing the backtest on the identified trading strategy using the retrieved calculations.

18. The method of claim 15, wherein the identified plurality of trading strategies are displayed on the client computing device as tiles in a grid layout.

19. The method of claim 14, wherein transmitting the trading signal to a remote computing device for execution of a trade using the trade parameters comprises:
retrieving a trade price for at least one financial instrument identified in the trade parameters;
determining a trade quantity of the at least one financial instrument using the trade price; and
transmitting the trading signal, the trade price and the trade quantity to the remote computing device.

20. The method of claim 19, wherein the remote computing device simulates execution of the trade based upon the trading signal, the trade price and the trade quantity and displays a result of the simulated execution on the client computing device.

21. The method of claim 19, wherein the remote computing device generates a trade alert upon receiving the trading signal from the server computing device and transmits the trade alert to the client computing device.

22. The method of claim 21, wherein the remote computing device executes the trade upon receiving a message from the client computing device in response to the trade alert.

23. The method of claim 19, wherein the remote computing device executes the trade based upon the trade price and the trade quantity upon receiving the trading signal from the server computing device.

24. The method of claim 14, wherein the identified indicators are retrieved from the cache without re-calculating the identified indicators.

25. The method of claim 14, wherein the one or more trading strategy parameters comprise a stock symbol.

26. The method of claim 14, wherein the user identifier comprises an account number.

\* \* \* \* \*